(12) United States Patent
Shvodian

(10) Patent No.: US 7,304,975 B2
(45) Date of Patent: Dec. 4, 2007

(54) METHOD FOR PROVIDING RAPID DELAYED FRAME ACKNOWLEDGEMENT IN A WIRELESS TRANSCEIVER

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 558 days.

(21) Appl. No.: 10/918,457

(22) Filed: Aug. 16, 2004

(65) Prior Publication Data
US 2006/0035589 A1    Feb. 16, 2006

(51) Int. Cl.
*H04L 1/00* (2006.01)

(52) U.S. Cl. ............ 370/338; 370/312; 370/449; 370/328; 370/349; 455/458; 455/517; 714/749

(58) Field of Classification Search ............ 370/229, 370/236, 242, 245, 278, 312, 322, 328, 338, 370/348, 350, 447, 449, 458, 508; 455/502, 455/512, 458, 517, 450, 509; 714/748–750; 710/30, 33, 45
See application file for complete search history.

(56) References Cited

U.S. PATENT DOCUMENTS

| | | | | |
|---|---|---|---|---|
| 5,528,605 | A * | 6/1996 | Ywoskus et al. | 714/749 |
| 6,954,890 | B2 * | 10/2005 | Gaskill et al. | 714/749 |
| 6,980,541 | B2 * | 12/2005 | Shvodian | 370/346 |
| 7,046,651 | B2 * | 5/2006 | Terry | 370/338 |
| 7,088,702 | B2 * | 8/2006 | Shvodian | 370/348 |
| 7,095,739 | B2 * | 8/2006 | Mamillapalli et al. | 370/390 |
| 2002/0108082 | A1 | 8/2002 | McDonnell | |
| 2003/0002449 | A1 | 1/2003 | Rittle et al. | |
| 2004/0013128 | A1 * | 1/2004 | Moreton et al. | 370/447 |
| 2004/0082356 | A1 * | 4/2004 | Walton et al. | 455/522 |
| 2004/0141503 | A1 | 7/2004 | Sinha | |
| 2004/0196850 | A1 * | 10/2004 | Ho | 370/395.4 |
| 2005/0129101 | A1 * | 6/2005 | Stephens et al. | 375/222 |
| 2005/0144307 | A1 * | 6/2005 | Li et al. | 709/232 |
| 2005/0190738 | A1 * | 9/2005 | Smavatkul et al. | 370/346 |
| 2005/0204247 | A1 * | 9/2005 | Guo et al. | 714/746 |
| 2005/0265371 | A1 * | 12/2005 | Sharma et al. | 370/428 |
| 2006/0034248 | A1 * | 2/2006 | Mishra et al. | 370/349 |

(Continued)

OTHER PUBLICATIONS

International Search Report issued from the Patent Cooperation Treaty dated Mar. 6, 2006.

(Continued)

*Primary Examiner*—George Eng
*Assistant Examiner*—Kamran Afshar

(57) ABSTRACT

A method (1200) is provided for allowing delayed acknowledgement in a local wireless transceiver. In this method the local transceiver (324) receives n data frames (1000) from a remote wireless transceiver (322), each data frame (1000) including a set of acknowledgement policy bits, which indicate a desired acknowledgement policy for the respective data frame (1000). The first (n—1) data frames (811-814) indicate an acknowledgement policy of delayed acknowledgement with no acknowledgement requested, while the final data frame (815) indicates an acknowledgement policy of delayed acknowledgement with acknowledgement requested. In response to the acknowledgement policy of the last data frame (815), the local transceiver (324) sends a delayed acknowledgement response frame (1135) to the remote wireless transceiver (322). This delayed acknowledgement response frame (1135) includes frame identifiers for the first (n–1) data frames (811-814), but does not include a frame identifier for the last data frame (815).

10 Claims, 9 Drawing Sheets

U.S. PATENT DOCUMENTS

2006/0063492 A1* 3/2006 Iacono et al. ............ 455/67.11
2006/0195629 A1* 8/2006 Sharma et al. ................. 710/30
2007/0025379 A1* 2/2007 May et al. .................. 370/428

OTHER PUBLICATIONS

Written Opinion of the International Searching Authority issued from the Patent Cooperation Treaty dated Mar. 6, 2006.

* cited by examiner

METHOD FOR PROVIDING RAPID DELAYED FRAME ACKNOWLEDGEMENT IN A WIRELESS TRANSCEIVER

FIELD OF THE INVENTION

The present invention relates in general to wireless communication systems, such as ultrawide bandwidth (UWB) systems or other wireless personal area networks, including mobile transceivers, centralized transceivers, related equipment, and corresponding methods. Another aspect of the invention relates to the rapid transmission of frames of data between two or more wireless devices. Another aspect of the invention relates to a method of providing a delayed acknowledgement for a group of frames that can be sent quickly after receiving the last of the frames.

BACKGROUND OF THE INVENTION

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY Layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged. Although the term frames will be used throughout the following description to describe units of data and acknowledgment, other names are used in other embodiments. For example, in the internet protocol data is arranged in packets or datagrams.

FIG. 3 is a block diagram of a wireless network according to an embodiment of the present invention that could use the IEEE 802.15 standard 200. In an embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a controller (i.e., it functions as a master) while the other devices follow the instructions of the controller (i.e., they function as slaves). The controller can be a designated device, or simply one of the devices chosen to function as a controller. One primary difference between devices and the controller is that the controller must be able to communicate with all of the devices in the network, while the various devices need not be able to communicate with all of the other devices.

As shown in FIG. 3, the network 300 includes a controller 310 and a plurality of devices 320. The controller 310 serves to control the operation of the network 300. As noted above, the system of controller 310 and devices 320 may be called a piconet, in which case the controller 310 may be referred to as a piconet controller (PNC). Each of the devices 320 must be connected to the controller 310 via primary wireless links 330, and may also be connected to one or more other devices 320 via secondary wireless links 340. Each device 320 of the network 300 may be a different wireless device, for example, a digital still camera, a digital video camera, a personal data assistant (PDA), a digital music player, or other personal wireless device.

In some embodiments the controller 310 may be the same sort of device as any of the devices 320, except with the additional functionality for controlling the system and the requirement that it communicate with every device 320 in the network 300. In other embodiments the controller may be a separate designated device.

The various devices 320 are confined to a usable physical area 350, which is set based on the extent to which the controller 310 can successfully communicate with each of the devices 320. Any device 320 that is able to communicate with the controller 310 (and vice versa) is within the usable area 350 of the network 300. As noted, however, it is not necessary for every device 320 in the network 300 to communicate with every other device 320.

FIG. 4 is a block diagram of a controller 310 or a device 320 from the network 300 of FIG. 3. As shown in FIG. 4, each controller 310 or device 320 includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 320. These upper layers 430 may include TCP/IP, TCP, UDP, RTP, IP, LLC, or the like.

Typically, the controller 310 and the devices 320 in a WPAN share the same bandwidth. Accordingly, the controller 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using time division multiple access (TDMA). Using this standard, the MAC layer 420 defines frames and superframes through which the sharing of the bandwidth by the devices 320 is managed by the controller 310 and/or the devices 320.

One way that transmission is managed is through the use of acknowledgement (ACK) signals that indicate when a destination device (i.e., a receiver device) has successfully received a frame of information from a source device (i.e., a transmitter device). This allows the source device to know with certainty that its information has successfully arrived at its destination.

Since speed is often a concern with data transmission, it is desirable that the time allowed for acknowledgement be as small as possible. This is because time spent sending acknowledgement signals is time not being spent passing data from the source device to the destination device, which reduces the total data rate for the transmission.

However, if this acknowledgement duration is not sufficiently long, it can cause even greater delays because acknowledgement frames won't pass through properly. And when that happens the source device must resend the data to ensure that it is properly received.

It would therefore be desirable to provide a way of sending acknowledgement frames that was both fast and accurate, allowing for a minimum loss of transmission time to provide signal acknowledgement.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF DISCLOSED EMBODIMENTS

Acknowledgement (ACK) is a process whereby a destination device provides an indication to a source device that a portion of data (e.g., a data frame) has been successfully transmitted. By way of example, an ultra wideband (UWB) system that uses simplex transmission will be described below. However, alternate embodiments can apply these teachings to different wireless systems.

Figure 1:
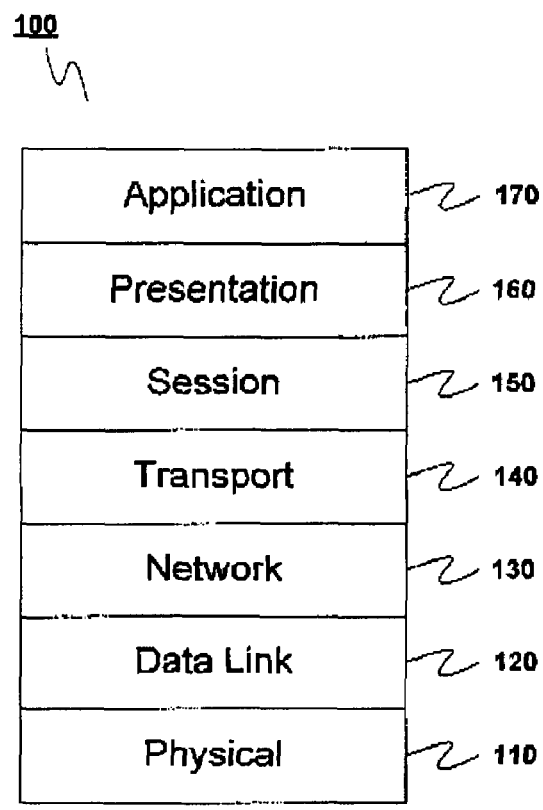
FIG. 1 shows the hierarchy of the seven-layered OSI standard.
Figure 2:
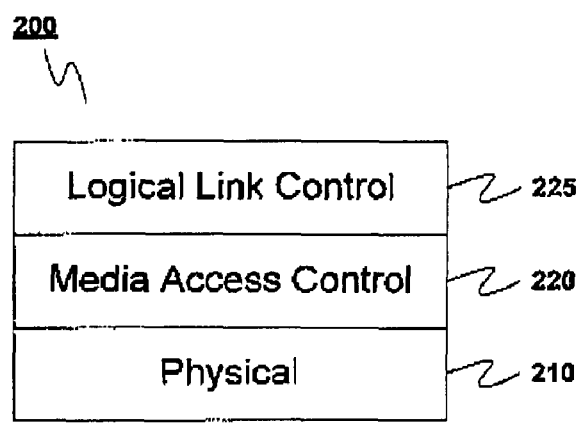
FIG. 2 shows the IEEE 802 standard 200.
Figure 3:
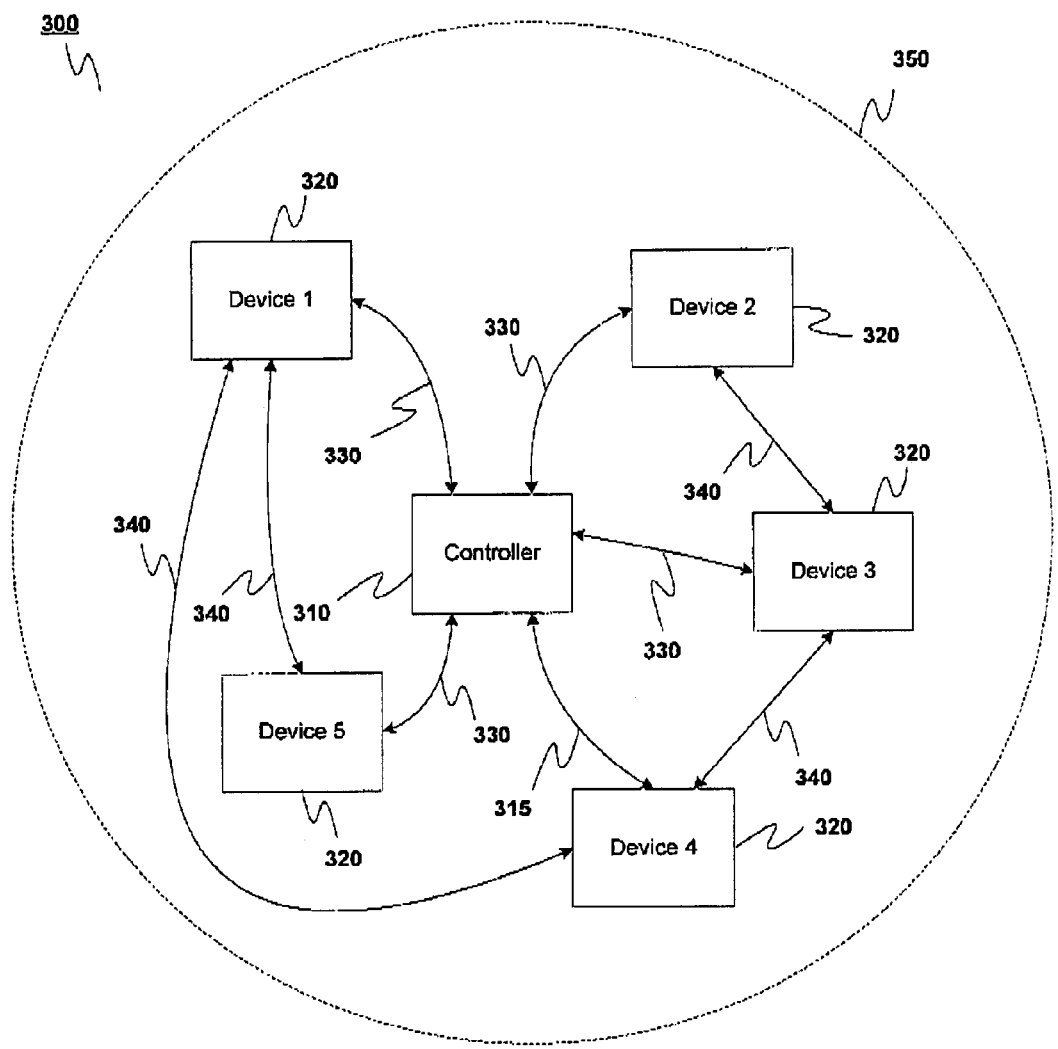
FIG. 3 is a block diagram of a wireless network according to an embodiment of the present invention.
Figure 4:
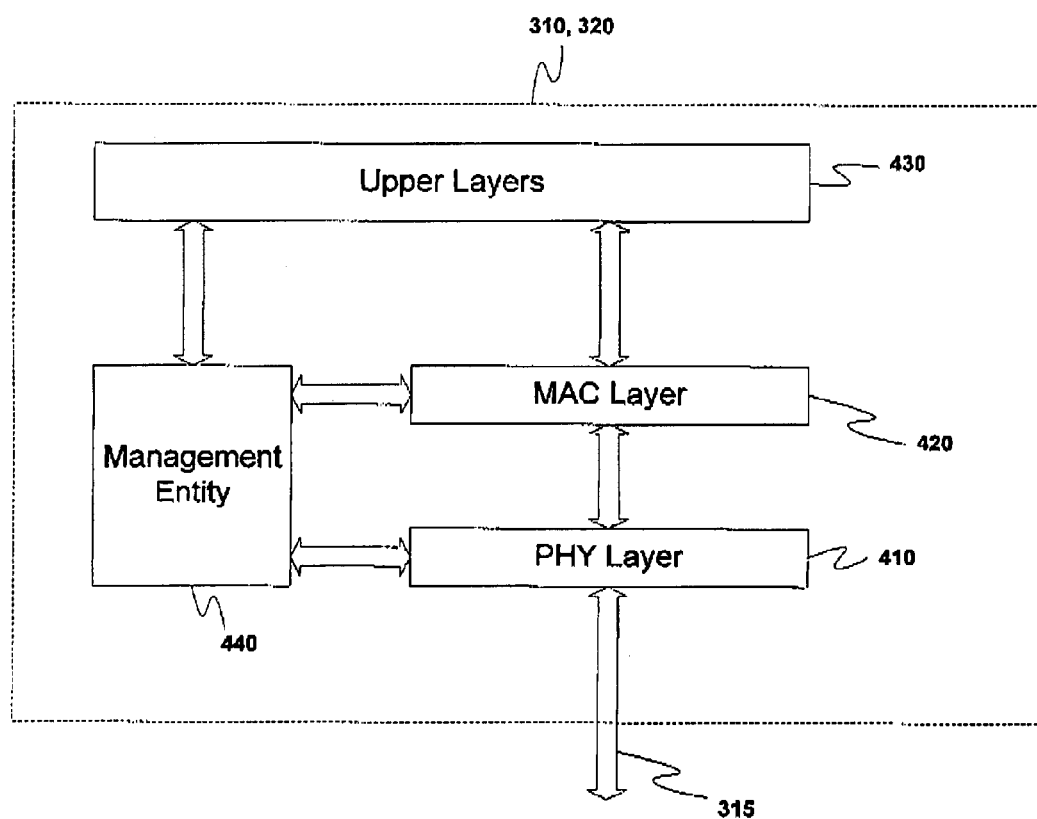
FIG. 4 is a block diagram of a device or controller in the wireless network of FIG. 3.
Figure 5:
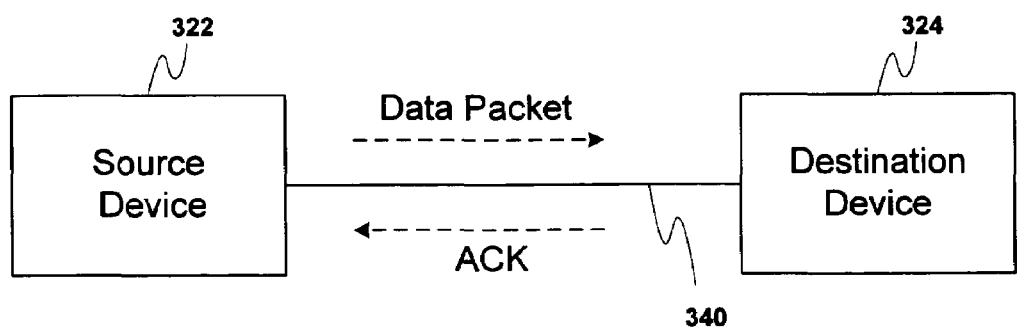
FIG. 5 is a block diagram of a subset of the network of FIG. 3, including a transmitting device and a receiving device connected by a secondary wireless link according to an embodiment of the present invention.

FIG. 5 is a block diagram of a subset of a network 300 including a source device 322 and a destination device 324 connected by a secondary wireless link 340. Although not shown, both the source device 322 and the destination device 324 are connected to a controller 310 via primary wireless links 330. In addition, if one of the devices 322, 324 were a controller 310, the primary wireless link 330 between them could be used for this transmission.

As shown in FIG. 5, the source device 322 sends a data frame 510 to the destination device 324, and if the destination device 324 successfully receives the data frame 510, then it sends an acknowledgement frame 520 to the transmitting device 324. If the destination device 324 does not successfully receive the data frame 510, no acknowledgement frame 520 is sent.

A wireless network 300 can perform this acknowledgement process in several ways. These ways can be referred to as the different acknowledgement policies that the system uses. Three possible types of acknowledgement are: no acknowledgement, immediate acknowledgement, and delayed acknowledgement.

A policy of no acknowledgement allows data to be transmitted without acknowledgement frame 520 being sent. The source device 322 simply sends its data frame 510 to the destination device 324 without any response from the destination device 324. This may be useful, for example, in real-time situations where low latency is required and there will be no opportunity to retransmit data, e.g., in unbuffered streaming audio or video.

A policy of immediate acknowledgement requires the destination device 324 to send an acknowledgement frame 520 when it receives an incoming data frame 510. This is the most time sensitive approach since it requires every data frame 510 to be individually acknowledged.

A policy of delayed acknowledgement allows the destination device 324 to wait until it receives a multiple data frames 510 before it has to acknowledge any of them. Once it receives these multiple data frames 510 and a request for an acknowledgement frame, the destination device 324 then sends an acknowledgement frame 520 that acknowledges all of them at once. The number of data frames 510 that may be acknowledged at once may be fixed during operation or may be changed dynamically by the network controller 310, as required by the particular implementation.

In a disclosed embodiment, information is provided in a frame header as to which kind of acknowledgement policy is being used. In this embodiment two separate delayed acknowledgement indicators are provided for the delayed acknowledgement policy. One indicator is provided for all of the frames that are sent prior to the last frame, and another indicator is provided for the last frame, which prompts the delayed acknowledgement response frame to be sent.

Table 1 shows an acknowledgement bit pattern according to one embodiment of the present invention. As shown in Table 1, the first bit provides an indication of whether a delayed acknowledgement is being used, while the second bit shows whether the destination device must send an acknowledgement frame upon receipt of the current frame (i.e., whether an immediate ACK frame must be sent or whether it is time to send the delayed ACK frame).

TABLE 1

Acknowledgement Policy Bits

| Bit Pattern | Acknowledgement Policy |
|---|---|
| 00 | No acknowledgement |
| 01 | Immediate acknowledgement |
| 10 | Delayed acknowledgement - no acknowledgement requested |
| 11 | Delayed acknowledgement - acknowledgement requested |

In this way, the two delayed acknowledgement policy bit patterns ("10" and "11") allow for two types of delayed acknowledgement data frames. The first type is data frames for whom the acknowledgement will be delayed by one or more data frames. These are the data frames that set their policy as delayed acknowledgement with no acknowledgement requested. The second type is the last data frame in the set of delayed acknowledgement data frames, for which acknowledgement will happen right away. (They are still considered to be covered by delayed acknowledgement, since they are within a group of data frames whose acknowledgement has been delayed.) These are the data frames that set their policy as delayed acknowledgement with acknowledgement requested.

Figure 6:
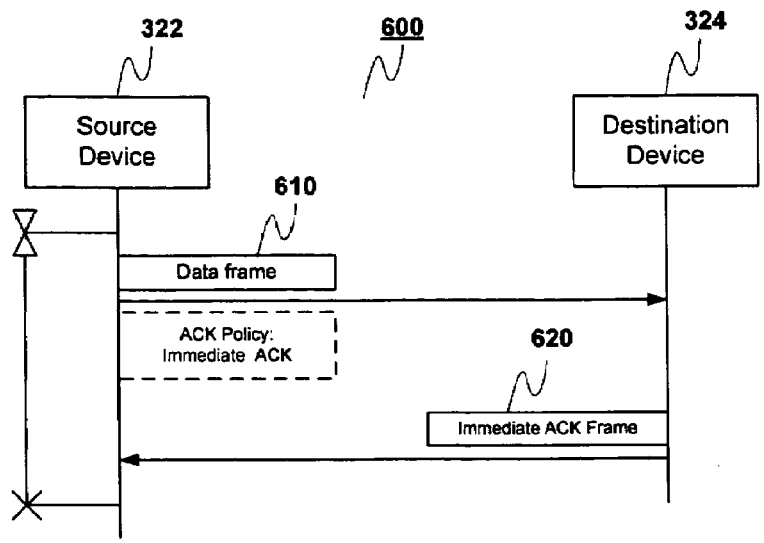
FIG. 6 is a message sequence chart of the transmission of a data frame with an immediate acknowledgement policy according to an embodiment of the present invention.

FIG. 6 is a message sequence chart of the transmission of a data frame with an immediate acknowledgement policy according to a disclosed embodiment of the present invention. As shown in FIG. 6, a data frame 610 is sent from a source device 322 to a destination device 324 with its acknowledgement policy set to immediate acknowledgement. Directly upon receiving the data frame 610, the destination device 324 sends an immediate acknowledgement frame 620 back to the source device 322. No additional information need be sent in the immediate acknowledgement frame 620, since the frame acknowledges the data frame 610 by its very existence (i.e., it would never have been sent if the destination device 324 had not successfully received the data frame 610).

As noted in FIG. 6, in the disclosed system, if the source device 322 does not receive an immediate acknowledgement frame 620, it will repeat the transmission of the data frame 610. However, alternate systems can address a failed acknowledgement in other ways.

Figure 7:
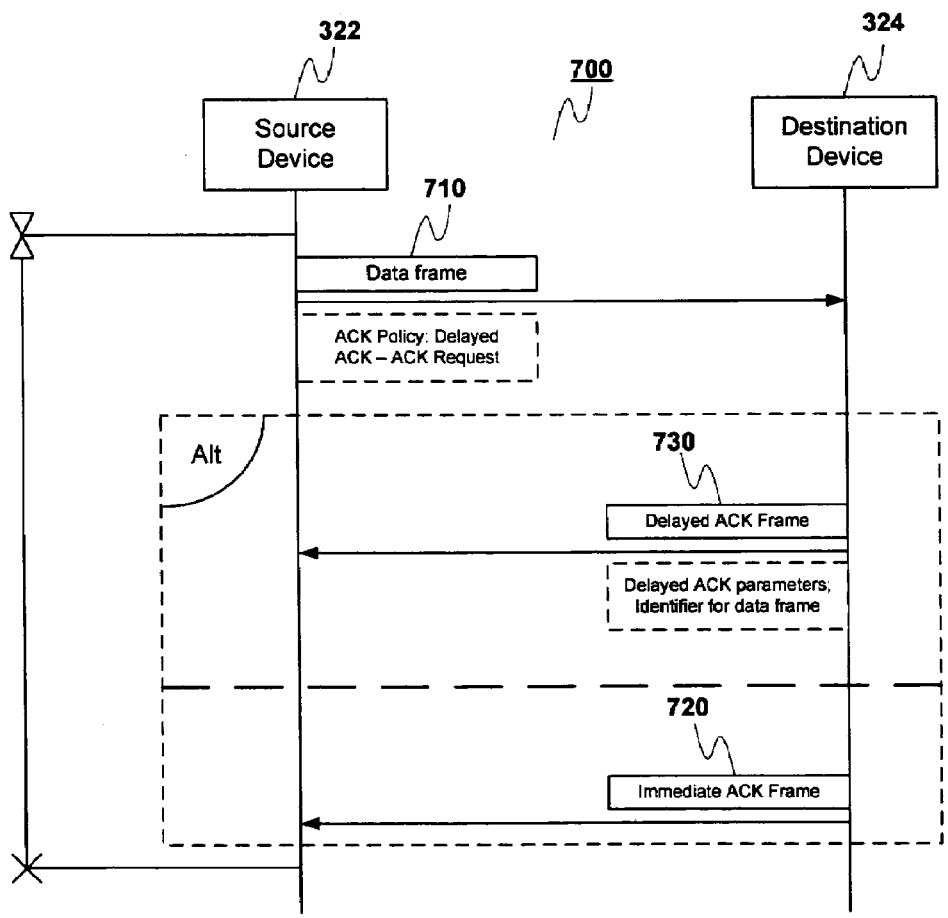
FIG. 7 is a message sequence chart of the transmission of a data frame with a delayed acknowledgement policy with acknowledgement requested for starting a delayed acknowledgement process according to an embodiment of the present invention.

FIG. 7 is a message sequence chart of the transmission of a data frame with a delayed acknowledgement policy with acknowledgement requested, used for starting a delayed acknowledgement process according to a disclosed embodiment of the present invention. As shown in FIG. 7, to start a delayed acknowledgement a data frame 710 is first sent from a source device 322 to a destination device 324 with its acknowledgement policy set to delayed acknowledgement with acknowledgement requested. This informs the destination device 324 that the source device 322 desires to use delayed acknowledgement.

In response to the delayed acknowledgement request in the data frame 710, the destination device 324 can respond in one of two alternative ways: with an immediate acknowledgement frame 720, or with a delayed acknowledgement response frame 730.

The immediate acknowledgement frame 720 is just like the immediate acknowledgement frame 620 used to reply to an immediate acknowledgement request, as shown in FIG. 6. By sending an immediate acknowledgement frame 720, the destination device 324 instructs the source device 322 that it will not allow delayed acknowledgement at the present time.

The delayed acknowledgement response frame 730 indicates that the destination device 324 will allow delayed acknowledgement and includes various delayed acknowledgement parameters. In the disclosed embodiment these parameters include: the maximum number of allowable frames of maximum frame size that will be acknowledged in future delayed acknowledgements, and the maximum number of allowable frames regardless of frame size that will be acknowledged in future delayed acknowledgements. The delayed acknowledgement response frame 730 also indicates the number of data frames that are currently being acknowledged (i.e., one for the first delayed ACK frame) and an identifier for the acknowledged data frame 710 (e.g., its MAC protocol data unit number), However, alternate embodiments can include more or less information.

As noted in FIG. 7, in the disclosed system, if the source device 322 does not receive either an immediate acknowledgement frame 720 or a delayed acknowledgement response frame 730, it will repeat the transmission of the data frame 710. However, alternate systems can address a failed acknowledgement in other ways.

Figure 8:
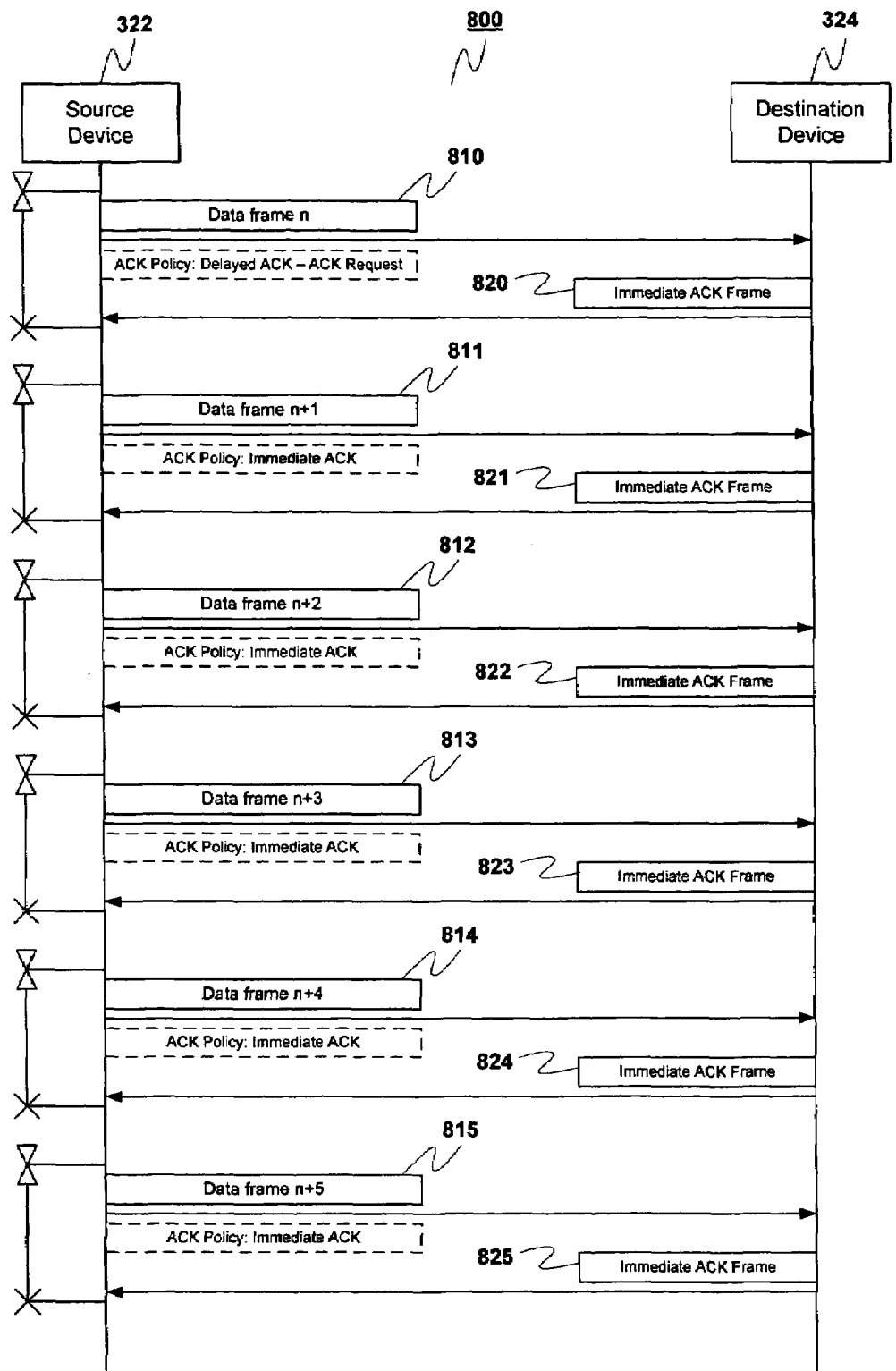
FIG. 8 is a message sequence chart of a message stream when a requested delayed acknowledgement is not allowed, according to an embodiment of the present invention.
Figure 9:
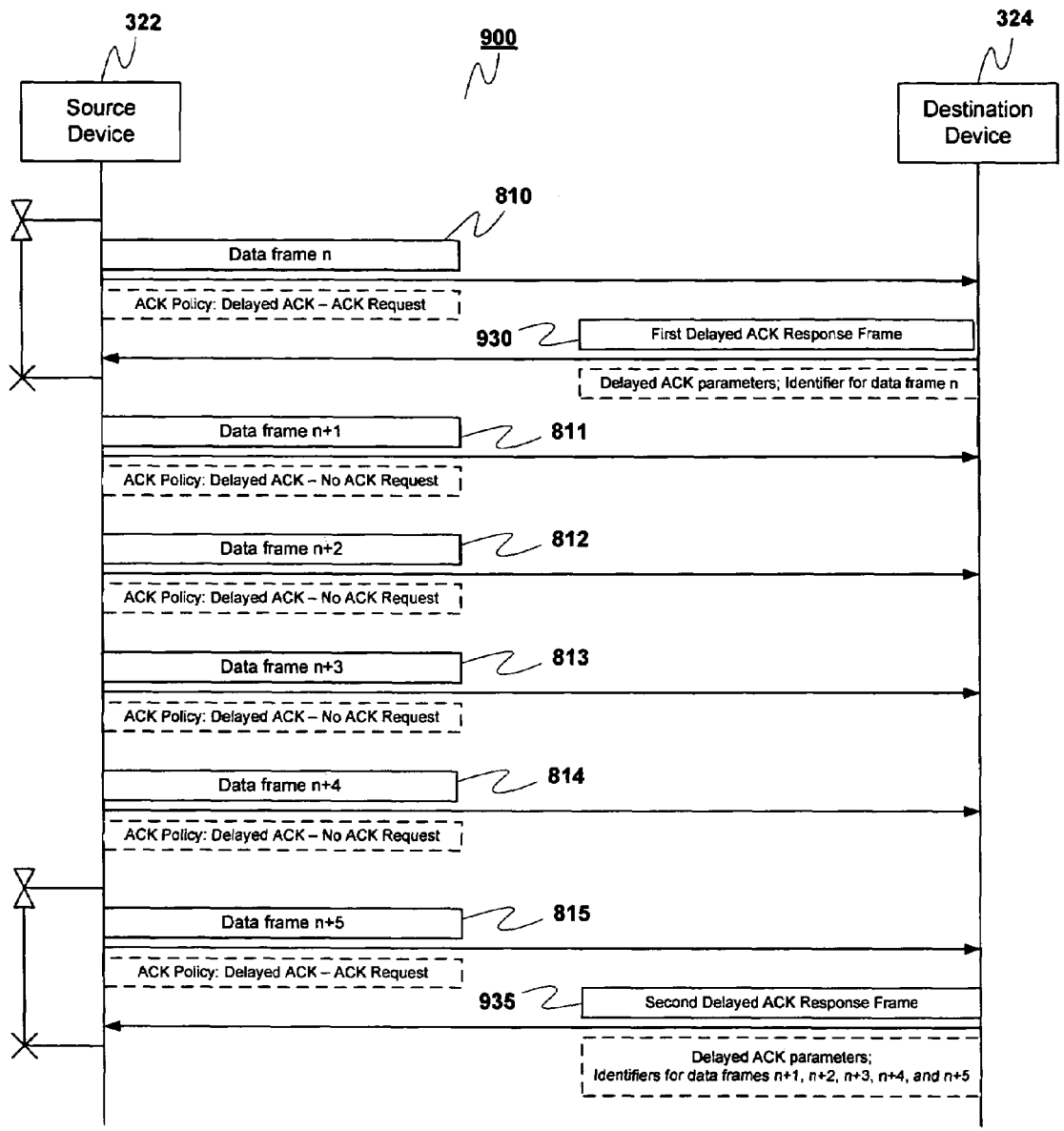
FIG. 9 is a message sequence chart of a message stream when a requested delayed acknowledgement is allowed, according to an embodiment of the present invention.

By supplying a single acknowledgement frame 720 or 730, the destination device 324 can reply to the request by the source device 322 for delayed acknowledgement. Further message traffic can then proceed based on the acknowledgement policy set forth by the destination device 324. FIG. 8 is a message sequence chart of a message stream when a requested delayed acknowledgement is not allowed, according to a disclosed embodiment of the present invention, while FIG. 9 is a message sequence chart of a message stream when a requested delayed acknowledgement is allowed, according to a disclosed embodiment of the present invention.

The message sequence chart of FIG. 8 refers to the situation where the destination device 324 denies a request for delayed acknowledgement. As shown in FIG. 8, a source device 322 begins by sending a data frame n 810 that has its acknowledgement policy set to delayed acknowledgement with acknowledgement requested. As shown above with respect to FIG. 7, this has the effect of requesting from the destination device 324 that delayed acknowledgement be used.

In this example the destination device 324 replies to the data frame n 810 with an immediate acknowledgement frame 820, indicating that delayed acknowledgement will not be allowed. In this case, the source device 322 must then send data frame (n+1) 811, data frame (n+2) 812, data frame (n+3) 813, data frame (n+4) 814, and data frame (n+5) 815 using an immediate acknowledgement policy (if any acknowledgement is desired), resulting in five additional immediate acknowledgement frames 821, 822, 823, 824, and 825.

As noted in FIG. 8, in the disclosed system, if the source device 322 does not receive an immediate acknowledgement frame 820, 821, 822, 823, 824, or 825 in response to a respective data frame 810, 811, 812, 813, 814, or 815, it will repeat the transmission of the data frame 810, 811, 812, 813, 814, or 815. However, alternate systems can address a failed acknowledgement in other ways.

The message sequence chart of FIG. 9 refers to the situation where the destination device 324 allows a request for delayed acknowledgement. As shown in FIG. 9, a source device 322 begins by sending a data frame n 810 that has its acknowledgement policy set to delayed acknowledgement with acknowledgement requested. As shown above with respect to FIG. 7, this has the effect of requesting a delayed acknowledgement from the destination device 324.

In this example the destination device 324 replies to the data frame n 810 by sending a first delayed acknowledgement response frame 930 to the source device 322, indicating that delayed acknowledgement will be allowed. The first delayed acknowledgement response frame 930 includes delayed acknowledgement parameters that define how the next delayed acknowledgement should be performed, as well as the fact that it is only acknowledging one data frame (i.e., data frame n 810), and an identifier for data frame n 810 (e.g., its MAC protocol data unit identifier and any fragment identifier). For the purposes of this example, the delayed acknowledgement parameters indicate that the destination device 324 will allow at least five frames to be acknowledged at one time.

Following receipt of the first delayed acknowledgement response frame 930, the source device 322 can then send a number of data frames (up to a maximum allowed minus one) without any acknowledgement required, followed by a final data frame that requires the delayed acknowledgement for all of the frames. In this case, the first frames have an acknowledgement policy set at delayed acknowledgement with no acknowledgement requested, while the last frame has an acknowledgement policy set at delayed acknowledgement with acknowledgement requested.

In the example given in FIG. 9, five data frames are sent with delayed acknowledgement after the first delayed acknowledgement response frame 930 is received at the source device 322. Data frame (n+1) 811, data frame (n+2) 812, data frame (n+3) 813, and data frame (n+4) 814 are sent with an acknowledgement policy of delayed acknowledgement with no acknowledgement requested. These can be sent by the source device 322 to the destination device 324 without it providing any response. Data frame (n+5) 815 is sent with an acknowledgement policy of delayed acknowledgement with acknowledgement requested. Since it requests acknowledgement, the data frame (n+5) 815 prompts the destination device 324 to send a second delayed acknowledgement response frame 935 to the source device 322.

The second delayed acknowledgement response frame 935 indicates that five data frames (811, 812, 813, 814, and 815) are being acknowledged, and includes identifiers for all five of these data frames. It also includes delayed acknowledgement parameters that will allow the source device 322 to send other data frames using delayed acknowledgement. These parameters can be the same parameters as given in the first delayed acknowledgement response frame 930, or they can be different, depending upon the embodiment.

As noted in FIG. 9, in the disclosed system, if the source device 322 does not receive a delayed acknowledgement response frame 930 or 935 in response to the respective data frame 810 or 815, it will repeat the transmission of the data frame 810 or 815 in question. However, alternate systems can address a failed acknowledgement in other ways.

One area of concern for any acknowledgement frame, however, regardless of the acknowledgement policy, is the allowable turnaround time for its transmission. In the embodiments disclosed in FIGS. 6 to 9, each acknowledgement frame, regardless of whether it is an immediate acknowledgement frame or a delayed acknowledgement response frame, must be turned around within the same period of time provided at the end of a data frame.

Figure 10:
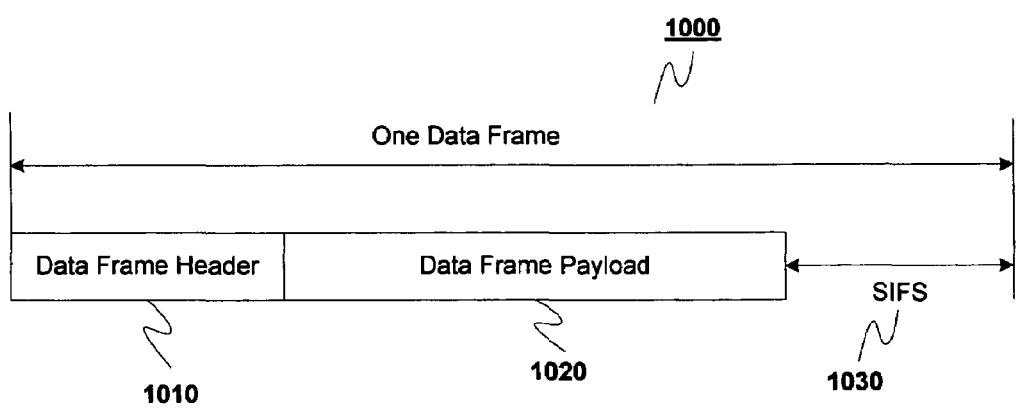
FIG. 10 is a block diagram of a data frame according to a disclosed embodiment of the present invention.

FIG. 10 is a block diagram of a data frame according to a disclosed embodiment of the present invention. As shown in FIG. 10, each data frame 1000 includes a data frame header 1010, a data frame payload 1020, and a short inter-frame space (SIFS) 1030.

The data frame header 1010 provides information about the frame being transmitted, e.g., information about version, frame type, acknowledgment policy, retry policy, security policy, etc. The size of the data frame header can vary among various embodiments, but remains constant in the disclosed embodiment.

The data frame payload 1020 includes the information that should be passed between two devices, i.e., the transmitted data. As a result, it can vary significantly in size. In the disclosed embodiment the data frame payload 1010 may vary from frame to frame below a set maximum payload size.

The SIFS 1030 is a space between adjacent data frames 1000 during which a source device 322 does not transmit anything. The SIFS 1030 provides channel time for the destination device 324 to provide an acknowledgement packet (whether an immediate acknowledgement or a delayed acknowledgement). In the disclosed embodiments the SIFS 10 is microseconds long, though this can vary in alternate embodiments. For example, in one alternate embodiment the SIFS is 5 microseconds long.

In the proposed IEEE 802.15.3 standard, both immediate acknowledgement and delayed acknowledgement have the same turnaround time. In other words, they both are sent during the SIFS 1030 of the most recently sent data frame 1000. As a result, this means that in every case the destination device 324 must generate and send the appropriate acknowledgement frame within the time allocated to the SIFS 1030. This is generally not a problem with immediate acknowledgement frames, which may have no payload and which require no more than a determination that the current frame from the source device 322 has been properly received. But it can result in some difficulty with delayed acknowledgement response frames, which require further information before they can be sent.

For example, when a destination device 324 receives a data frame 1000 with its acknowledgement policy set at delayed acknowledgement with acknowledgement requested, the destination device 324 will have to perform a number of tasks in a very short amount of time. These tasks may include checking the header from the received frame as well as the header check sequence (HCS) and the frame check sequence (FCS), then inserting identifier information (e.g., an MAC protocol data unit identifier and fragment identifier) from the most recently received data frame into the frame payload of the delayed acknowledgement response frame, and then transmitting the delayed acknowledgement response frame—all within the SIFS duration 1030 in the last received data frame 1000.

And even if a different period for acknowledgment is provided, there will likely be some limit on its duration in order to limit the overhead cost in the channel time allocation.

In many implementations, it will therefore be necessary to have either an extremely fast processor or a hardware solution to allow a destination device 324 to successfully modify a delayed acknowledgement response frame and begin transmission within the allowable acknowledgement duration (e.g., the duration of the SIFS 1030). And both a fast processor and a hardware solution to this problem can significantly increase the cost of each device.

However, an alternate embodiment can eliminate this problem. Each acknowledgement frame (whether an immediate acknowledgement or a delayed acknowledgement) inherently serves as an acknowledgement of the most recently received data frame, without any need to specifically identify that frame. This is true because in order for the destination device 324 to know to send an acknowledgement frame, it must have successfully received the most recently sent data frame.

As a result, it is unnecessary for the acknowledgement frame to provide any information identifying the most recently sent data frame. Its very existence acknowledges receipt of the most recently sent data frame. And the source device 322 will be able to properly identify the most recently sent data frame, since it was the device that transmitted it.

As a result, delayed acknowledgement response frames do not need to specifically identify the most recently sent data frame (i.e., the data frame whose acknowledgement policy was delayed acknowledgement with acknowledgement requested, which prompted the transmission of the delayed acknowledgement response frame), since the destination device 324 must have successfully received the most recently sent data frame for it to know that it needed to send the delayed acknowledgement response frame. Furthermore, since the source device 322 knows the identity of the most recently sent data frame, it is also not necessary for the destination device 324 to include any frame identification information for that particular frame in the acknowledgement frame it sends to the source device 322.

Thus, in this alternate embodiment the delayed acknowledgement response frame is sent just as shown above with respect to FIG. 9, except that the delayed acknowledgement response frame does not include identification information regarding the most recently sent data frame.

This allows the delayed acknowledgement response frame to be mostly created significantly in advance of transmission. All of the delayed acknowledgement parameters are known to the destination device 324 before receipt of data frames and can be loaded into the acknowledgement frame before any data frames are even received. No acknowledgement frame needs to be sent in response to a data frame whose acknowledgment policy is delayed acknowledgment with no acknowledgment requested, so the destination device 324 has a longer period of time to extract the data frame identifying information from that frame and store it in the delayed acknowledgment frame.

Upon receipt of the a data frame with an acknowledgement policy of delayed acknowledgement with acknowledgement requested, the destination device need only determine whether the data frame was successfully received, and need not extract any identifying information. (It can perform this function, for example, by checking the header from the received frame as well as the HCS and the FCS, to make certain that the frame was received properly.) Any indicator of either the total number of data frames being acknowledged, or the number of data frames specifically identified in the acknowledgement frame (i.e., the total number of data frames being acknowledged minus one), can easily be determined in a short time and loaded into the delayed acknowledgment frame.

Early creation of the delayed acknowledgement response frame enables the destination device 324 to meet the quick turnaround time required for the destination device 324 when delayed acknowledgement is used in 802.15.3. In other words, this allows the delayed acknowledgement response frame to be finalized and sent within the time allocated in a single SIFS 1030 when the most recently sent data frame 1000 requests a delayed acknowledgment frame.

An alternate embodiment can be provided, however, in which the most recently sent data frame may or may not be acknowledged by the delayed acknowledgement response frame. In this embodiment all that is required to send a delayed acknowledgement response frame is that the header in the most recently sent data frame be successfully received (i.e., the HCS of the most recently sent data frame checks out). This will provide the destination device 324 with the necessary information to send the delayed acknowledgement response frame.

In this embodiment the delayed acknowledgement response frame will have to include an additional most recent frame bit (e.g., in its header) that indicates whether the most recently sent data frame was properly received or not. In this way if the destination device 324 successfully receives the header of the most recently sent data bit (i.e., its HCS checks out), but does not successfully receive its payload (i.e., the FCS does not check out), then the destination device can still acknowledge all of the other data frames in the delayed acknowledgement response frame. In this case, the source device will receive express acknowledgement for the data frames listed in the delayed acknowledgement response frame, and will know from the most recent frame bit whether it needs to resend the most recently sent data frame or not.

Figure 11:
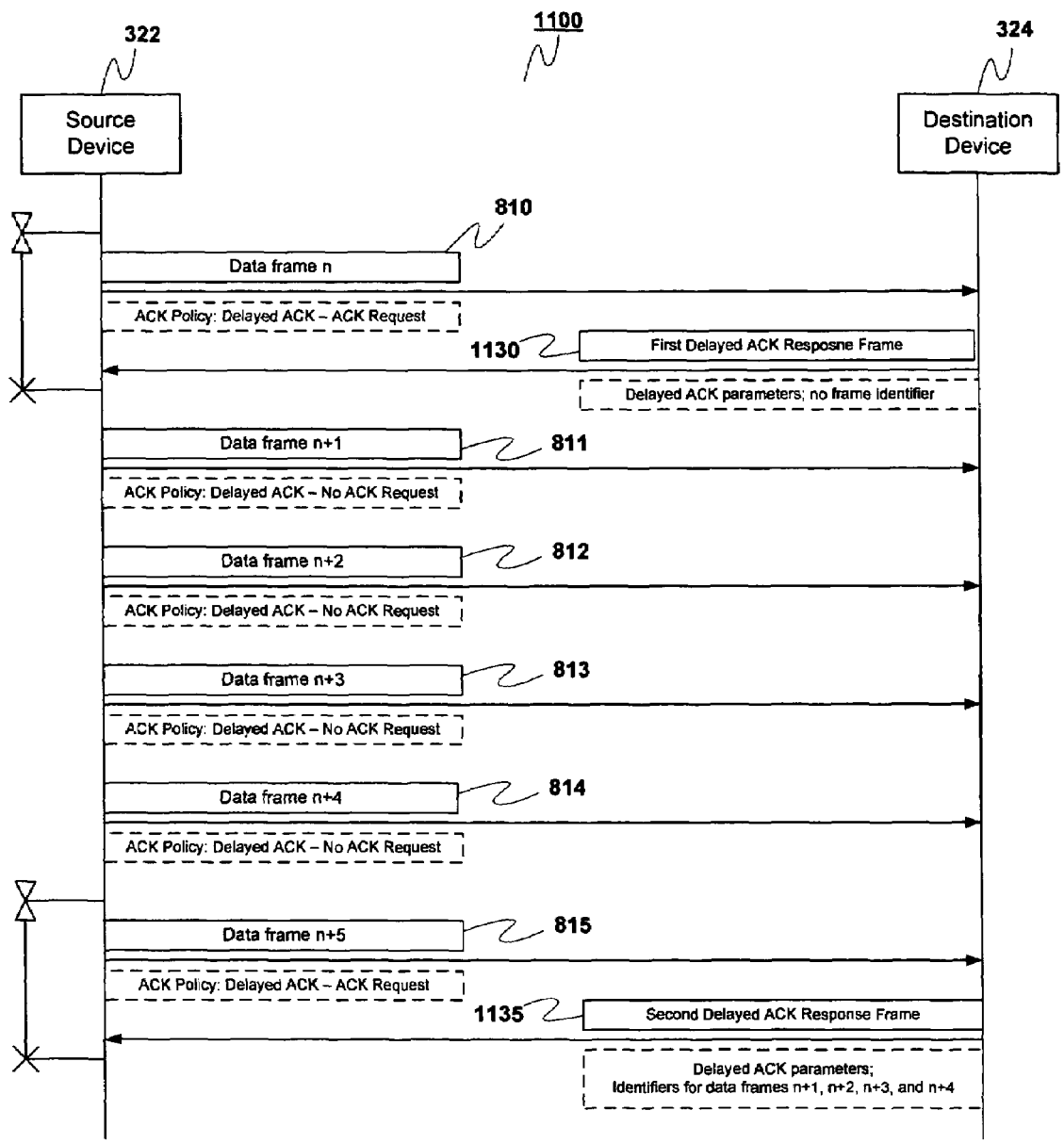
FIG. 11 is a message sequence chart of a delayed acknowledgement process according to a second embodiment of the present invention.

FIG. 11 is a message sequence chart of a delayed acknowledgement process according to a second disclosed embodiment of the present invention. As shown in FIG. 11, a source device 322 begins by sending a data frame n 810 that has its acknowledgement policy set to delayed acknowledgement with acknowledgement requested. As shown above with respect to FIG. 7, this has the effect of requesting a delayed acknowledgement from the destination device 324.

In this example the destination device 324 replies to the data frame n 810 with a first delayed acknowledgement response frame 1130, indicating that delayed acknowledgement will be allowed, and providing delayed acknowledgement parameters. This acknowledgement frame 1130 also includes the fact that it is only acknowledging one data frame (i.e., data frame n 810) but does not include any frame identifier information. For the purposes of this example, the delayed acknowledgement parameters indicate that the destination device 324 will allow at least five frames to be acknowledged at one time.

Following receipt of the first delayed acknowledgement response frame 1130, the source device 322 can then send a number of data frames (up to a maximum allowed minus one) without any acknowledgement required, followed by a final data frame that requires the delayed acknowledgement for all of the frames. In this case, the first frames have an acknowledgement policy set at delayed acknowledgement with no acknowledgement requested, while the last frame has an acknowledgement policy set at delayed acknowledgement with acknowledgement requested.

In the example given in FIG. 11, five data frames are sent with delayed acknowledgement. Data frame (n+1) 811, data frame (n+2) 812, data frame (n+3) 813, and data frame (n+4) 814 are sent having an acknowledgement policy of delayed acknowledgement with no acknowledgement requested. These can be sent by the source device 322 to the destination device 324 without any response required. Data frame (n+5) 815 is then sent having an acknowledgement policy of delayed acknowledgement with acknowledgement requested. Since it requests the acknowledgement, the data frame (n+5) prompts the destination device to send a second delayed acknowledgement response frame 1135.

The second delayed acknowledgement response frame 1135 indicates that five data frames are being acknowledged, and includes identifiers for the first four of these data frames. No identifying information need be given for data frame (n+5), since the second delayed acknowledgment frame 1035 inherently acknowledges data frame (n+5), and the source device 322 knows the identifying information for data frame (n+5).

The delayed acknowledgment frame 1035 also includes delayed acknowledgement parameters that will allow the source device 322 to send other data frames using delayed acknowledgement. These parameters can be the same parameters as given in the first delayed acknowledgement response frame 1130, or they can be different, depending upon the embodiment.

As noted in FIG. 11, in the disclosed system, if the source device 322 does not receive a delayed acknowledgement response frame 1130 or 1135 in response to the respective data frame 810 or 815, it will repeat the transmission of the data frame 810 or 815. However, alternate systems can address a failed acknowledgement in other ways.

Figure 12:
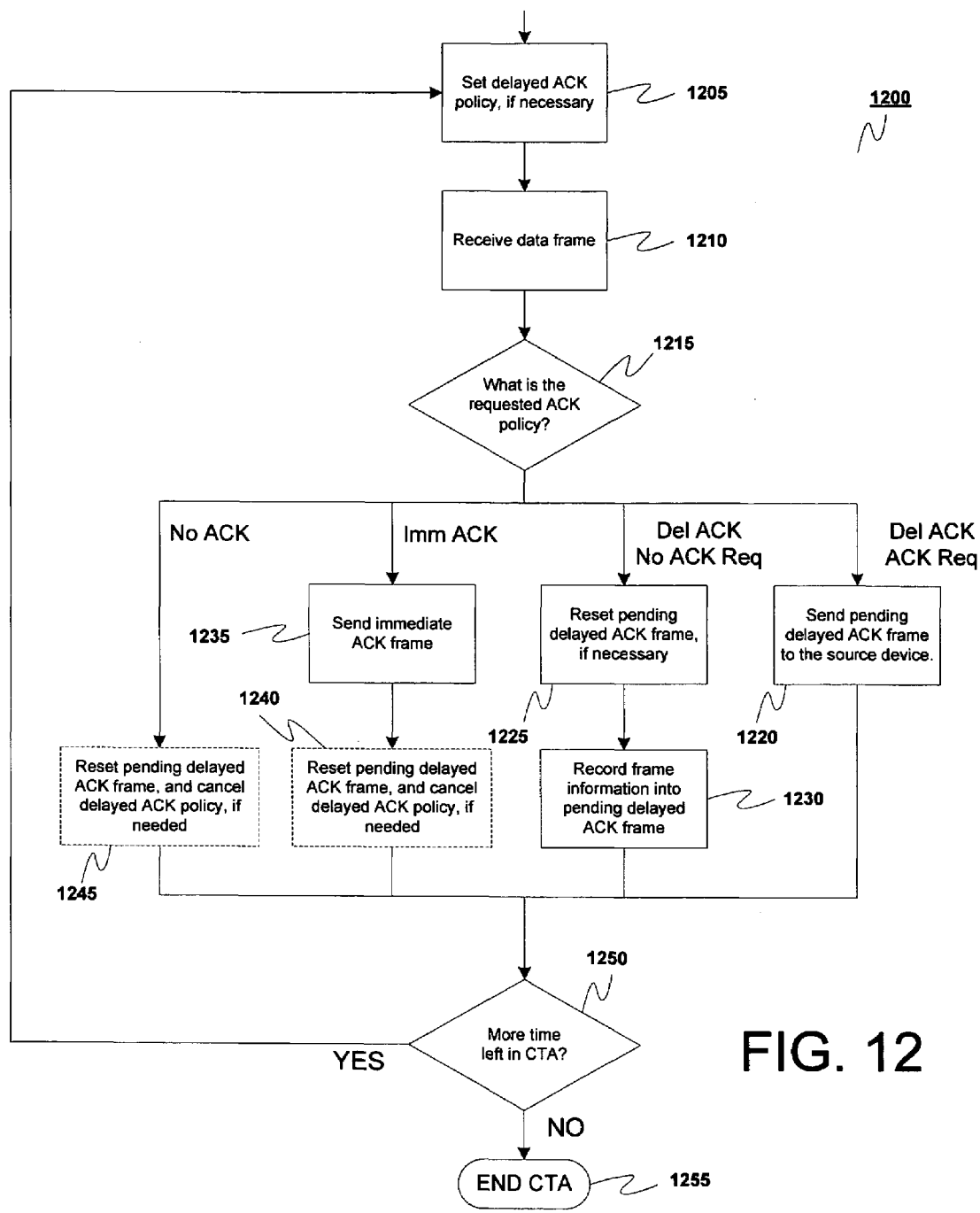
FIG. 12 is a flow chart of the operation of the destination device in the delayed acknowledgement process of FIG. 11.

FIG. 12 is a flow chart of the operation of the destination device in the delayed acknowledgement process of FIG. 11. As shown in FIG. 12, the description of the operation of the destination device 324 begins prior to the receipt of any data frames when the destination device 324 sets its delayed acknowledgement policy. (Step 1205)

At this time, the destination device determines whether it will allow delayed acknowledgement, and if so, under what conditions it will allow for delayed acknowledgement. If delayed acknowledgement is allowed, the various delayed acknowledgement parameters are stored into a delayed acknowledgement response frame that can be sent whenever a delayed acknowledgement request is received.

Processing continues when the destination device 324 receives a data frame. (Step 1210) In its header, this data frame will include a set of requested acknowledgement policy bits, which the destination device 324 will look at to determine the acknowledgement policy that the source device 322 wants for the received data frame. (Step 1215) In the disclosed embodiment the acknowledgement policy bits have the format given above in Table 1. However, alternate embodiments could represent possible acknowledgement states in different ways.

If the current data frame has indicated a policy of delayed acknowledgement with acknowledgement requested, then the destination device 324 sends the pending delayed acknowledgement response frame to the source device (Step 1220). If the current data frame is the first data frame to request delayed acknowledgement, then the delayed acknowledgement response frame will have no data frame identifiers in it, but will simply include the delay acknowledgement parameters that had previously been loaded, along with an indicator of how many data frames are being acknowledged (i.e., one). If, however, the current data frame is not the first data frame to request delayed acknowledgement, then the delayed acknowledgement response frame will include a number of data frame identifiers for previous data frames that need to be acknowledged, along with an indicator as to how many data frames are being acknowledged, as well as the stored delay acknowledgement parameters.

The delayed acknowledgement response frame does not need to include an identifier for the most recently received data frame, since the delayed acknowledgement response frame will inherently acknowledge that data frame and the source device 322 will know the identifying information for that data frame. Furthermore, although the indicator as to how many data frames are being acknowledged is shown to include the most recently received data frame in this tally, it may also be set to indicate only the number of data frames whose identifiers are included in the delayed acknowledgment frame, depending upon the implementation. In some embodiments this indicator may even be omitted altogether, leaving the source device 322 to calculate the value based on the other information in the delayed acknowledgment frame. Regardless, the source device 322 will know how this tally is determined (or how to calculated it) so that it will be able to ascertain whether all data frames have been properly acknowledged.

If the current data frame has indicated a policy of delayed acknowledgement with no acknowledgement requested, then the destination device 324 first resets the pending delayed acknowledgement response frame (i.e., clears out any stored data frame identifiers) if the data frame is the first in the current delayed acknowledgment process. (Step 1225) Since a policy of delayed acknowledgement with no acknowledgement requested will only occur once a successful delayed acknowledgement response frame has been received, this will make it certain that a pending delayed acknowledgement response frame will not be erased until it has been successfully sent. Alternate embodiments can address the security of the pending delayed acknowledgement response frame in other ways, however.

Then the destination device 324 records the identifying information of the current frame into the pending delayed acknowledgement response frame. (Step 1230) This makes certain that should the next data frame request an acknowledgement, the acknowledgement frame will be ready to send with minimal modification.

Also, if the requested acknowledgement policy is delayed acknowledgement with no acknowledgement requested, then the destination device 324 may also perform a determination as to whether delayed acknowledgement has previously been requested. If not, then some sort of error processing may take place.

In addition, although not shown, there may be some further determination if any kind of delayed acknowledgement is requested as to whether too many frames have been sent with a request for delayed acknowledgement. If the maximum number of allowable delayed acknowledgements is exceeded, some sort of error processing may take place.

If the current data frame has requested immediate acknowledgement, then the destination device 324 sends an immediate acknowledgement frame to the source device 322. (Step 1235) In certain embodiments that require all delayed acknowledgement response frames to be contiguous, this will also trigger a cancellation of any existing delayed acknowledgement policy and will require that the pending delayed acknowledgement response frame be cleared of all data frame identifiers. (Step 1240)

If the current data frame has requested no acknowledgement, then the destination device 324 does not send any information back to the source device 322. In certain embodiments that require all delayed acknowledgement response frames to be contiguous, this will also trigger a cancellation of any existing delayed acknowledgement policy and will require that the pending delayed acknowledgement response frame be cleared of all data frame identifiers. (Step 1245)

Once the requested acknowledgement policy has been addressed, the destination device 324 determines whether there is more time left in the current CTA assigned between the source device 322 and the destination device 324. (Step 1250)

If there is time left in the CTA, the destination device 324 returns to Step 1205 and continues processing. In this case Step 1205 may or may not need to be repeated, depending upon the implementation. Where the delayed acknowledgement parameters are fixed for a given CTA, this step can be omitted and the processing can continue directly to Step 1210. If, however, the delayed acknowledgement parameters can vary between delayed acknowledgment processes, then they may be changed at this time (so long as the device is not in the middle of a delayed acknowledgment process) and the information stored in the pending delayed acknowledgement response frame should be updated so that it can be transmitted without delay when it is time to send the next delayed acknowledgment frame.

If there is no time left in the CTA then the CTA ends. (Step 1255)

In one embodiment disclosed in FIG. 12 (the embodiment without steps 1240 and 1245), delayed acknowledgement response frames can be split up within a given channel time allocation (CTA), or within successive CTAs. Alternate embodiments may be arranged such that these distributions of delayed acknowledgement response frames are not allowed. In this case, it will be necessary to perform error checks to make certain that these prohibitions are not violated. In addition, steps 1240 and 1245 should be added as necessary to keep the pending delayed acknowledgement response frame in the proper form.

As shown in FIG. 12, the operation performed at the destination device 324 allows for a delayed acknowledgement response frame to be sent with very little holdup whenever it is requested. Because no identifying information about the current data frame need be included in the delayed acknowledgement response frame, it can be sent with a very quick turnaround time. All that is required is minimal processing to determine whether the most recently transmitted data frame was properly received. This allows for a much simpler implementation that will still allow for all possible acknowledgement frames (e.g., immediate and delayed) to be sent within the time allocated for acknowledgement (e.g., within the set SIFS duration 1030 of a data frame 1000).

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing delayed acknowledgement in a local wireless transceiver, comprising:

receiving a first data frame from a remote wireless transceiver, the first data frame including a first set of acknowledgement policy bits, which indicate that the first data frame has a first desired acknowledgment policy of delayed acknowledgement with acknowledgement requested;

sending a first delayed acknowledgement response frame to the remote wireless transceiver after receiving the first data frame;

receiving second through $(n-1)^{th}$ data frames from a remote wireless transceiver, the second through $(n-1)^{th}$ data frames including second through $(n-1)^{th}$ acknowledgement policy bits, respectively, which indicate that the second through $(n-1)^{th}$ data frames have second through $(n-1)^{th}$ desired acknowledgement policies of delayed acknowledgement with no acknowledgement requested;

receiving an $n^{th}$ data frame from a remote wireless transceiver, the $n^{th}$ data frame including an $n^{th}$ set of acknowledgement policy bits, which indicate that the $n^{th}$ data frame has an $n^{th}$ desired acknowledgement policy of delayed acknowledgement with acknowledgement requested; and sending a second delayed acknowledgement response frame to the remote wireless transceiver after receiving the $n^{th}$ data frame, wherein the first delayed acknowledgement response frame does not include a first frame identifier identifying the first data frame, wherein the second delayed acknowledgement response frame includes second through $(n-1)^{th}$ frame identifiers, identifying the second through $(n-1)^{th}$ data frames, respectively, and wherein the second delayed acknowledgement response frame does not include an $n^{th}$ frame identifier identifying the $n^{th}$ data frame.

2. A method for providing delayed acknowledgement in a local wireless transceiver, as recited in claim 1, wherein the second through $(n-1)^{th}$ frame identifiers are media access controller protocol data unit identifiers.

3. A method for providing delayed acknowledgement in a local wireless transceiver, as recited in claim 1, wherein the second through $(n-1)^{th}$ frames are fragmented frames and the second through $(n-1)^{th}$ frame identifiers each include fragment identifiers for their respective frame.

4. A method for providing delayed acknowledgement in a local wireless transceiver, as recited in claim 1, wherein the first delayed acknowledgement response frame is sent during a first short inter-frame space during the first data frame, and wherein the second delayed acknowledgement response frame is sent during an $n^{th}$ short inter-frame space during the $n^{th}$ data frame.

5. A method for providing delayed acknowledgement in a local wireless transceiver, as recited in claim 1,
wherein the first delayed acknowledgement response frame further includes first delayed acknowledgement parameters that define a first delayed acknowledgement policy, and
wherein the second delayed acknowledgement response frame further includes second delayed acknowledgement parameters that define a second delayed acknowledgement policy.

6. A method for providing delayed acknowledgement in a local wireless transceiver, as recited in claim 5, wherein the first and second delayed acknowledgement policies are the same.

7. A method for providing delayed acknowledgement in a local wireless transceiver, as recited in claim 5, wherein the first delayed acknowledgement parameters include at least one of: a first maximum number of allowable frames of a maximum frame size for acknowledgement in the second delayed acknowledgement response frame, and a second maximum number of allowable frames regardless of frame size that may be acknowledged in the second delayed acknowledgement response frame.

8. A method for providing delayed acknowledgement in a local wireless transceiver, as recited in claim 7, wherein the second delayed acknowledgement parameters include at least one of: a third maximum number of allowable frames of the maximum frame size for acknowledgement in a third delayed acknowledgement response frame, and a fourth maximum number of allowable frames regardless of frame size that may be acknowledged in the third delayed acknowledgement response frame.

9. A method for providing delayed acknowledgement in a local wireless transceiver, as recited in claim 1, wherein the method is implemented in an ultra wideband device.

10. A method for providing delayed acknowledgement in a local wireless transceiver, as recited in claim 1, wherein the method is implemented in an integrated circuit.

* * * * *